US012298781B2

(12) United States Patent
Takahashi et al.

(10) Patent No.: US 12,298,781 B2
(45) Date of Patent: May 13, 2025

(54) IMAGING SYSTEM FOR IMAGING MOVABLE OBJECT

(71) Applicant: JVCKENWOOD Corporation, Yokohama (JP)

(72) Inventors: Jun Takahashi, Yokohama (JP); Eiji Nakano, Yokohama (JP); Yukiko Ikeda, Yokohama (JP); Shinnosuke Yamamoto, Yokohama (JP); Masaya Mihara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 204 days.

(21) Appl. No.: 18/307,882

(22) Filed: Apr. 27, 2023

(65) Prior Publication Data

US 2023/0350432 A1    Nov. 2, 2023

(30) Foreign Application Priority Data

Apr. 27, 2022    (JP) ................. 2022-072948

(51) Int. Cl.
| | | |
|---|---|---|
| G05D 1/661 | (2024.01) | |
| B64U 70/93 | (2023.01) | |
| G05D 1/00 | (2006.01) | |
| H04N 7/18 | (2006.01) | |
| B64U 101/31 | (2023.01) | |
| G05D 105/55 | (2024.01) | |

(52) U.S. Cl.
CPC ............ *G05D 1/101* (2013.01); *B64U 70/93* (2023.01); *G05D 1/661* (2024.01); *H04N 7/183* (2013.01); *H04N 7/188* (2013.01); *B64U 2101/31* (2023.01); *G05D 2105/55* (2024.01)

(58) Field of Classification Search
CPC ...... G05D 1/101; G05D 1/0094; G05D 1/652; G05D 1/656; G05D 1/661; G05D 1/663; G05D 1/686; G05D 1/689; G05D 2105/345; G05D 2105/55; G05D 2109/20; G05D 2111/52
See application file for complete search history.

(56) References Cited

U.S. PATENT DOCUMENTS

| | | | |
|---|---|---|---|
| 10,562,624 B2 * | 2/2020 | Baur | .................... G05D 1/0038 |
| 11,579,633 B1 * | 2/2023 | Haslam | .................. G05D 1/101 |
| 2016/0240020 A1 * | 8/2016 | Tang | ..................... B64U 50/19 |

(Continued)

FOREIGN PATENT DOCUMENTS

| | | | |
|---|---|---|---|
| CN | 111216668 A | * | 6/2020 |
| JP | 2021-142819 A | | 9/2021 |

OTHER PUBLICATIONS

CN 111216668 A—machine translation (Year: 2020).*

*Primary Examiner* — Dino Kujundzic
(74) *Attorney, Agent, or Firm* — Shih IP Law Group, PLLC (57) ABSTRACT

When an acceleration equal to or larger than a threshold value is exerted to a vehicle, an unmanned air vehicle takeoff and landing dock unlocks an unmanned air vehicle in a direction opposite to a direction in which the acceleration is exerted. When an acceleration detector of the unmanned air vehicle detects the acceleration equal to or larger than a threshold value, a flight controller of the unmanned air vehicle controls flight of the unmanned air vehicle to cause the unmanned air vehicle to ascend. Further, the unmanned air vehicle starts imaging by an imaging unit and starts transmitting imaging data acquired.

8 Claims, 8 Drawing Sheets

(56) References Cited

U.S. PATENT DOCUMENTS

| | | | |
|---|---|---|---|
| 2019/0061663 A1* | 2/2019 | Benmimoun | G05D 1/0094 |
| 2020/0385116 A1* | 12/2020 | Sabripour | B64U 10/60 |
| 2021/0116942 A1* | 4/2021 | Gandiga | G05D 1/0011 |
| 2021/0362856 A1* | 11/2021 | Hashiguchi | B64U 10/60 |

* cited by examiner

IMAGING SYSTEM FOR IMAGING MOVABLE OBJECT

CROSS-REFERENCE TO RELATED APPLICATION

This application is based upon and claims the benefit of priority from the prior Japanese Patent Application No. 2022-72948, filed on Apr. 27, 2022, the entire contents of which is incorporated herein by reference.

BACKGROUND

1. Field

The present invention relates to imaging technologies and, more particularly, to an imaging system for imaging a movable object.

2. Description of the Related Art

Development of unmanned air vehicles such as drones for flying in the sky above as desired and imaging a movable object on the ground from the sky above has been pursued. When the distance between the moving object and the unmanned air vehicle is maintained to be constant, it might become impossible to image a movable object that is moving from a desired imaging position. Therefore, imaging is controlled based on how the movable object is moving (e.g., patent literature 1).

[Patent Literature 1] JP 2021-142819

Unmanned air vehicles capable of imaging movable objects are used to, for example, image a movable object when a collision accident or the like occurs in the movable object. It is desired to control takeoff and landing of such unmanned air vehicles properly.

SUMMARY

An imaging system according to an aspect of the embodiment includes: an unmanned air vehicle capable of flying and an unmanned air vehicle takeoff and landing dock capable of locking the unmanned air vehicle in a movable object, wherein, when an acceleration equal to or larger than a threshold value is exerted to the movable object, the unmanned air vehicle takeoff and landing dock unlocks the unmanned air vehicle in a direction opposite to a direction in which the acceleration is exerted, the unmanned air vehicle includes: a flight controller that controls flight of the unmanned air vehicle; an imaging unit that images a range including at least a vertical direction of the unmanned air vehicle; an imaging controller that controls imaging by the imaging unit to acquire imaging data; a communication controller that transmits the imaging data acquired by the imaging controller to another device; and an acceleration detector that detects an acceleration exerted to the unmanned air vehicle. When the acceleration detector detects the acceleration equal to or larger than a threshold value, the flight controller controls flight of the unmanned air vehicle to cause the unmanned air vehicle to ascend, the imaging controller causes the imaging unit to start imaging, and the communication controller starts transmitting the imaging data acquired by the imaging controller.

Another aspect of the embodiment also relates to an imaging system. The imaging system includes an unmanned air vehicle capable of flying and an unmanned air vehicle takeoff and landing dock capable of locking the unmanned air vehicle in a movable object, wherein, when an acceleration equal to or larger than a threshold value is exerted to the movable object, the unmanned air vehicle takeoff and landing dock unlocks the unmanned air vehicle in a direction opposite to a direction in which the acceleration is exerted, the unmanned air vehicle includes: a flight controller that controls flight of the unmanned air vehicle; an imaging unit that images a range including at least a vertical direction of the unmanned air vehicle; an imaging controller that controls imaging by the imaging unit to acquire imaging data; a communication controller that transmits the imaging data acquired by the imaging controller to another device; and a locking detector that detects unlocking from the unmanned air vehicle takeoff and landing dock. When the locking detector detects unlocking, the flight controller controls flight of the unmanned air vehicle to cause the unmanned air vehicle to ascend, the imaging controller causes the imaging unit to start imaging, and the communication controller starts transmitting the imaging data acquired by the imaging controller.

Optional combinations of the aforementioned constituting elements, and implementations of the embodiment in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Exemplary Embodiment 1

A brief summary will be given before describing the invention in specific details. The exemplary embodiment relates to an imaging system that coordinates a movable object such as an automobile with an unmanned air vehicle such as a drone to capture an image useful for the movable object from the unmanned air vehicle. Drive recorders configured to detect the acceleration exerted to a movable object when the movable object is braked suddenly or when the movable object collides with an object and to record an image have been popularly used. As in the case of a drive recorder, an image useful for investigation into an accident, etc. can be obtained by imaging a movable object from the sky above by using an imaging device such as an unmanned air vehicle. Flying an unmanned air vehicle above a movable object in the sky continuously while the movable object is traveling makes it highly likely that the electric power for flying the unmanned air vehicle does not last and that the unmanned air vehicle might interfere with another object around the movable object. It is therefore proper to start flying an unmanned air vehicle when an accident or the like occurs in a movable object.

However, detecting an accident or the like and causing the unmanned air vehicle to take off might not work properly because control is attempted in the presence of an impact. Further, flight position control on the unmanned air vehicle in such a situation might not work properly, either. Also, depending on the accident, it may be proper to capture an image in front of the movable object or it may be proper to capture an image behind the movable object, and it is not easy to make such a decision instantly. The imaging system according to the exemplary embodiment is directed to the purpose of causing an unmanned air vehicle to take off properly when an event occurs in a movable object and to capture an image from a proper flight position.

Figure 1A:
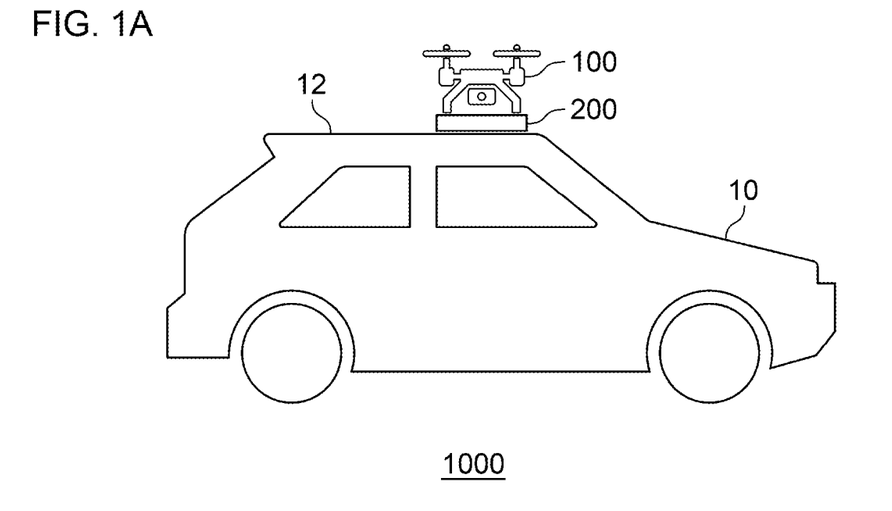
FIGS. 1A-1B show the appearance of the imaging system according to exemplary embodiment 1.
Figure 1B:
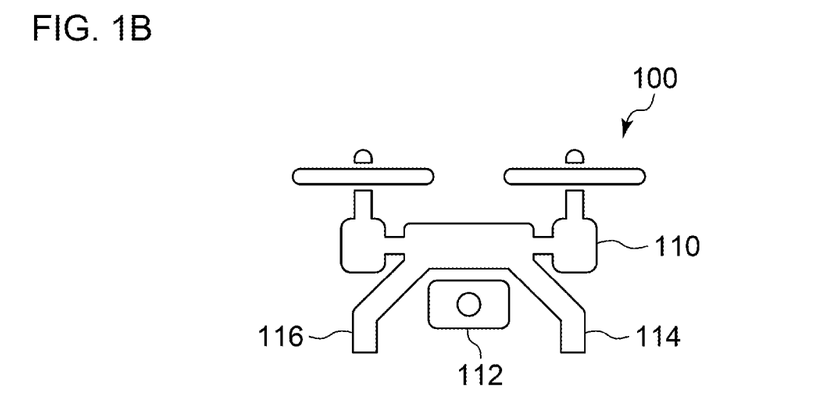

FIGS. 1A-1B show the appearance of an imaging system 1000. FIG. 1A shows an imaging system 1000 mounted on a vehicle 10. The vehicle 10 is a movable object such as an automobile. The right side of FIG. 1A corresponds to the front side of the vehicle 10, and the left side of FIG. 1A corresponds to the rear side of the vehicle 10. An unmanned air vehicle takeoff and landing dock 200 is provided on a roof 12 of the vehicle 10. The unmanned air vehicle takeoff and landing dock 200 can lock the unmanned air vehicle 100. The unmanned air vehicle 100 is, for example, a drone and can fly. The unmanned air vehicle 100 may automatically fly or may be flown by remote control.

FIG. 1B shows the appearance of the unmanned air vehicle 100. The unmanned air vehicle 100 has a drive unit 110 and also has an imaging unit 112. A front leg part 114 is provided in the front side of the unmanned air vehicle 100, and a rear leg part 116 is provided in the rear side of the unmanned air vehicle 100. The front leg part 114 and the rear leg part 116 are locked to the unmanned air vehicle takeoff and landing dock 200, and the structure thereof will be described later.

Figure 2:
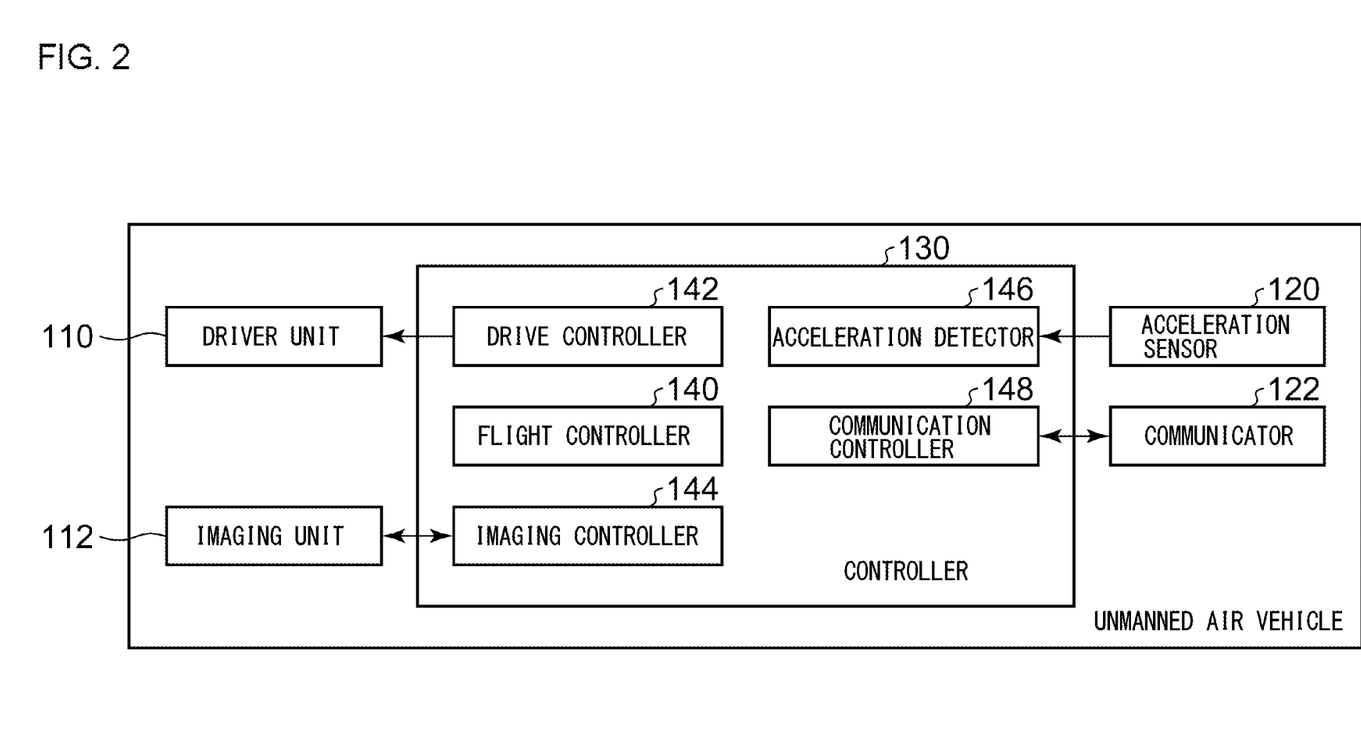
FIG. 2 shows the configuration of the unmanned air vehicle of FIGS. 1A-1B.

FIG. 2 shows the configuration of the unmanned air vehicle 100. The unmanned air vehicle 100 includes the drive unit 110, the imaging unit 112, a communication unit 122, and a controller 130. The controller 130 includes a flight controller 140, a drive controller 142, an imaging controller 144, an acceleration detector 146, and a communication controller 148. The flight controller 140 controls flight of the unmanned air vehicle. The flight controller 140 outputs the detail of flight control to the drive controller 142. The drive controller 142 is connected to the drive unit 110 and controls the operation of the drive unit 110. The drive unit 110 is a motor or the like and provides a driving force for flying the unmanned air vehicle 100.

The imaging unit 112 images a range including at least the vertical direction of the unmanned air vehicle. Imaging produces moving images or a still image. The imaging controller 144 controls imaging by the imaging unit 112 and acquires moving images or a still image (hereinafter, these are referred to as "imaging data") from the imaging unit 112. The communication unit 122 can communicate wirelessly with another device (not shown). A publicly known technology may be used for wireless communication, and a description thereof is omitted. The communication controller 148 controls the communication unit 122 to, for example, transmit the image data acquired by the imaging controller 144 to another device.

The acceleration sensor 120 measures the acceleration exerted to the unmanned air vehicle 100. The acceleration detector 146 detects the acceleration exerted to the unmanned air vehicle 100 based on the result of measurement by the acceleration sensor 120. The acceleration sensor 120 is, for example, a three-axis acceleration sensor. For example, the acceleration detector 146 detects whether the acceleration produced by sudden braking and collision of the vehicle 10 (not shown) carrying the unmanned air vehicle 100 equal to or larger than a threshold value is detected. The acceleration detector 146 refers to information on acceleration acquired from the acceleration sensor 120 and detects that the acceleration equal to or larger than the threshold value is detected when the acceleration in the horizontal direction is, for example, equal to or larger than 1.0 G, which is defined as the threshold value. Further, the acceleration detector 146 identifies the direction of acceleration and, for example, the forward direction or the rearward direction, when the acceleration equal to or larger than the threshold value is detected.

Figure 3A:
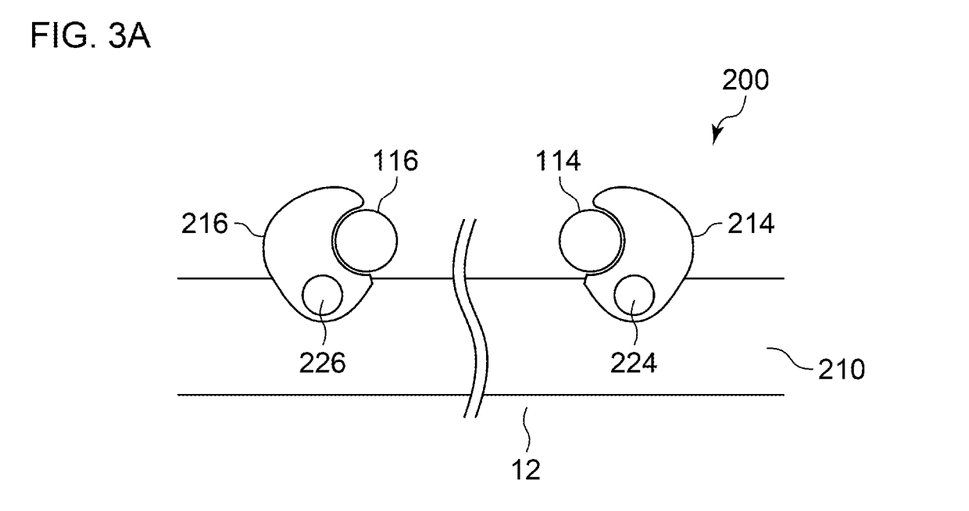
FIGS. 3A-3B show a summary of the operation of the unmanned air vehicle takeoff and landing dock of FIG. 1A.

FIGS. 3A-3B show a summary of the operation of the unmanned air vehicle takeoff and landing dock 200. FIG. 3A is an enlarged side view of FIG. 1A showing a portion of the unmanned air vehicle takeoff and landing dock 200 provided on the roof 12. In particular, the figure shows the unmanned air vehicle 100 locked to the unmanned air vehicle takeoff and landing dock 200. The unmanned air vehicle takeoff and landing dock 200 includes a base 210, a front locking part 214, a rear locking part 216, a front shaft 224, and a rear shaft 226. The base 210 is provided on the roof 12. The front locking part 214 is locked in the counterclockwise direction around the front shaft 224 and is rotatable in the clockwise direction. The front locking part 214 has a repelling force produced by a spring or the like in the clockwise direction. The rear locking part 216 is locked in the clockwise direction around the rear shaft 226 and is rotatable in the counterclockwise direction. The rear locking part 216 has a repelling force produced by a spring or the like in the counterclockwise direction. The front leg part 114 and the rear leg part 116 of the unmanned air vehicle 100 have a columnar shape elongated in, for example, the horizontal direction. The front leg part 114 is held by a stress exerted by the front locking part 214 from front to rear. The rear leg part 116 is held by a stress exerted by the rear locking part 216 from rear to front.

Figure 3B:
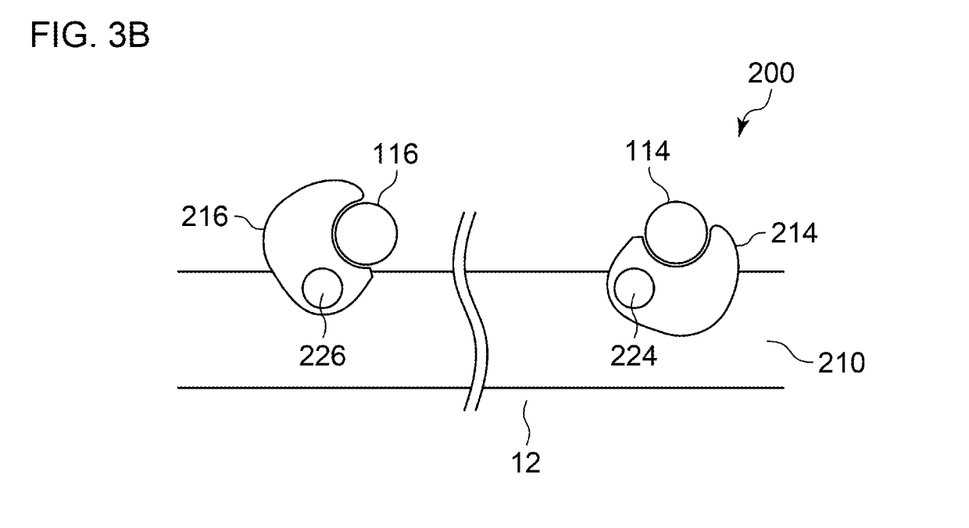

FIG. 3B shows a state in which the rearward acceleration is produced in the vehicle 10. When the vehicle 10 is suddenly braked or collides with another vehicle 10 in front, a decelerating acceleration is produced in the vehicle 10. A decelerating acceleration is a negative acceleration relative to the direction of travel and is the acceleration produced in the rearward direction opposite to the direction of travel. In this process, the inertia of the unmanned air vehicle 100 exerts a force that presses the unmanned air vehicle 100 in the direction of travel of the vehicle 10. As shown in FIG. 3B, the rear locking part 216 is locked in the clockwise direction around the rear shaft 226 and so continues to press the rear leg part 116 in the presence of this force. Meanwhile, the front locking part 214 is locked in the counterclockwise direction around the front shaft 224 but is rotated by the inertia of the unmanned air vehicle 100 in the clockwise direction to unlock the front shaft 224. It can be said that, when the acceleration equal to or greater than the threshold value is exerted to the vehicle 10, the unmanned air vehicle 100 is unlocked in the direction opposite to the direction in which the acceleration is exerted. The front locking part 214 may be structured such that the repelling force in the clockwise direction is temporarily removed. Further, the acceleration equal to or larger than the threshold value exerted in the longitudinal direction of the vehicle 10 is the acceleration corresponding to that of sudden braking or collision of the vehicle 10.

When the acceleration in the direction of travel, i.e., the forward direction is exerted in the vehicle 10, the inertia of the unmanned air vehicle 100 exerts a force that presses the unmanned air vehicle 100 in the direction opposite to the direction of travel of the vehicle 10. The front locking part 214 is locked in the counterclockwise direction around the front shaft 224 and so continues to press the front leg part 114 in the presence of this force. Meanwhile, the rear locking part 216 is locked in the clockwise direction around the rear shaft 226 but is rotated by the inertia of the unmanned air vehicle 100 in the counterclockwise direction to unlock the rear shaft 226. The rear locking part 216 may be structured such that the repelling force in the counterclockwise direction is temporarily removed.

Figure 4A:
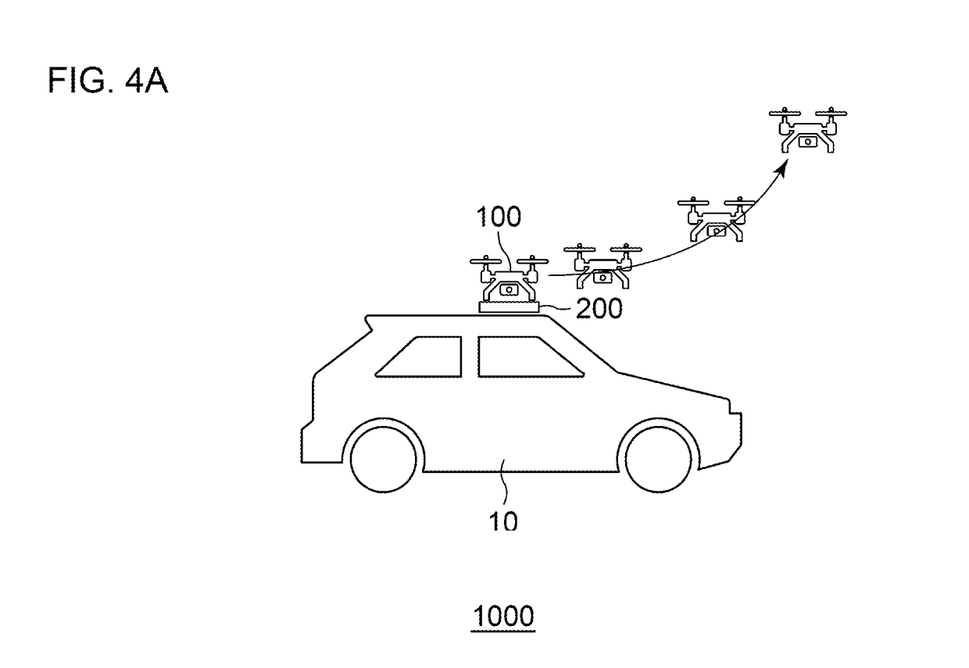
FIGS. 4A-4B show a flight trajectory of the unmanned air vehicle of FIGS. 1A-1B.
Figure 4B:
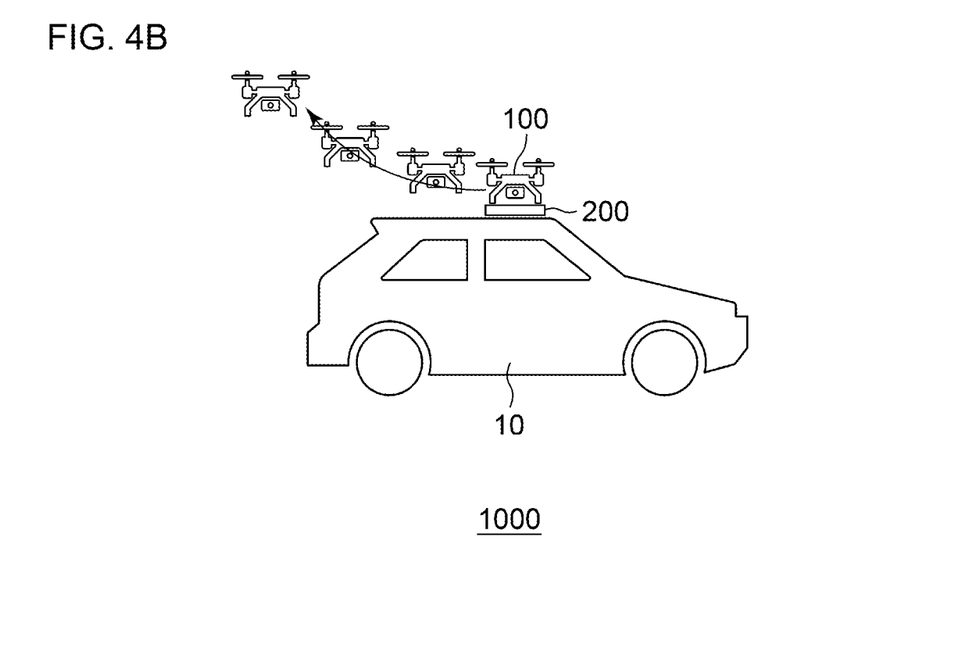

FIGS. 4A-4B show a flight trajectory of the unmanned air vehicle 100. FIG. 4A shows a state in which the rearward acceleration is produced in the vehicle 10. As described above, sudden braking of the vehicle or collision with another vehicle 10 in front produces the rearward acceleration in the vehicle 10 and unlocks the front locking part 214. The resultant inertia presses the unmanned air vehicle 100 in the forward direction of the vehicle 10. As the unmanned air vehicle 100 starts an ascending operation in this process, the unmanned air vehicle 100 moves forward and upward relative to the vehicle 10. As a result, the unmanned air vehicle 100 will be able to capture an image from a position above in the sky where the situation of an accident, etc. can be easily covered.

FIG. 4B shows a state in which the forward acceleration is produced in the vehicle 10. This corresponds to a case in which another vehicle 10 collides with the vehicle 10 provided with the unmanned air vehicle 100 from behind. As described above, the forward acceleration produced in the vehicle 10 unlocks the rear locking part 216. The resultant inertia presses the unmanned air vehicle 100 in the rearward direction of the vehicle 10. As the unmanned air vehicle 100 starts an ascending operation in this process, the unmanned air vehicle 100 moves rearward and upward relative to the vehicle 10. As a result, the unmanned air vehicle 100 will be able to capture an image from a position above in the sky where the situation of an accident or the like can be easily covered.

A description will now be given of the operation of the unmanned air vehicle 100 in such a state by referring back to FIG. 2. When the lock by the front locking part 214 or the rear locking part 216 in the opposite to the direction of acceleration is released by the occurrence of sudden braking or collision of the vehicle 10, the acceleration detector 146 detects the acceleration equal to or larger than the threshold value.

When the acceleration detector 146 detects the acceleration equal to or larger than the threshold value, the flight controller 140 controls the flight of the unmanned air vehicle 100 to cause the unmanned air vehicle 100 to ascend. For example, the flight controller 140 controls the drive controller 142 so that the altitude of the unmanned air vehicle 100 is greater than the altitude of the unmanned air vehicle 100 locked to the unmanned air vehicle takeoff and landing dock 200 and smaller than the maximum of about 5 m. Further, the flight controller 140 controls the drive controller 142 so that the distance between the vehicle 10 and the unmanned air vehicle 100 is less than the maximum of about 3-5 m. For such control, the unmanned air vehicle 100 may be provided with the positioning function such as global navigation satellite system (GNSS), or the unmanned air vehicle 100 may be provided with the function of recognizing moving images captured by the imaging unit 112.

Further, the flight controller 140 may control whether to return the unmanned air vehicle 100 to the unmanned air vehicle takeoff and landing dock 200. The flight controller 140 determines, for example, to make a return when a predetermined period of time such as 5 minutes elapses since the start of imaging process in the imaging unit 112. To enable a return of the unmanned air vehicle 100, a marker (characteristic shape) is provided on the upper surface of the base 210 of the unmanned air vehicle takeoff and landing dock 200. The flight controller 140 controls the drive controller 142 to make a landing in alignment with the marker shown in the moving images captured by the imaging unit 112. The flight controller 140 may control the flight of the unmanned air vehicle 100 such that the marker continues to be included in the imaging field angle of the imaging unit 112 since takeoff until the unmanned air vehicle 100 returns. In this case, it is preferred to ensure that the unmanned air vehicle 100 can identify the vehicle 10 to return to, by, for example, providing vehicles with different characteristics.

When the acceleration detector 146 detects the acceleration equal to or larger than the threshold value, the imaging controller 144 causes the imaging unit 112 to start imaging. Following this, the communication controller 148 causes the communication unit 122 to start transmitting the image data acquired by the imaging controller 144. The communication unit 122 transmits the image data to the recorder provided in the vehicle 10, to the mobile terminal possessed by the user of the vehicle 10, to the server of an insurance provider that the user of the unmanned air vehicle 100 is in contact with, to the server of a security business provider, etc. in accordance with an instruction from the communication controller 148. After the imaging controller 144 caused the imaging unit 112 to start imaging, the flight controller 140 controls the flight of the unmanned air vehicle 100 to maintain a predetermined distance and a predetermined altitude from the vehicle 10.

The features are implemented in hardware such as a CPU, a memory, or other LSIs, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 5:
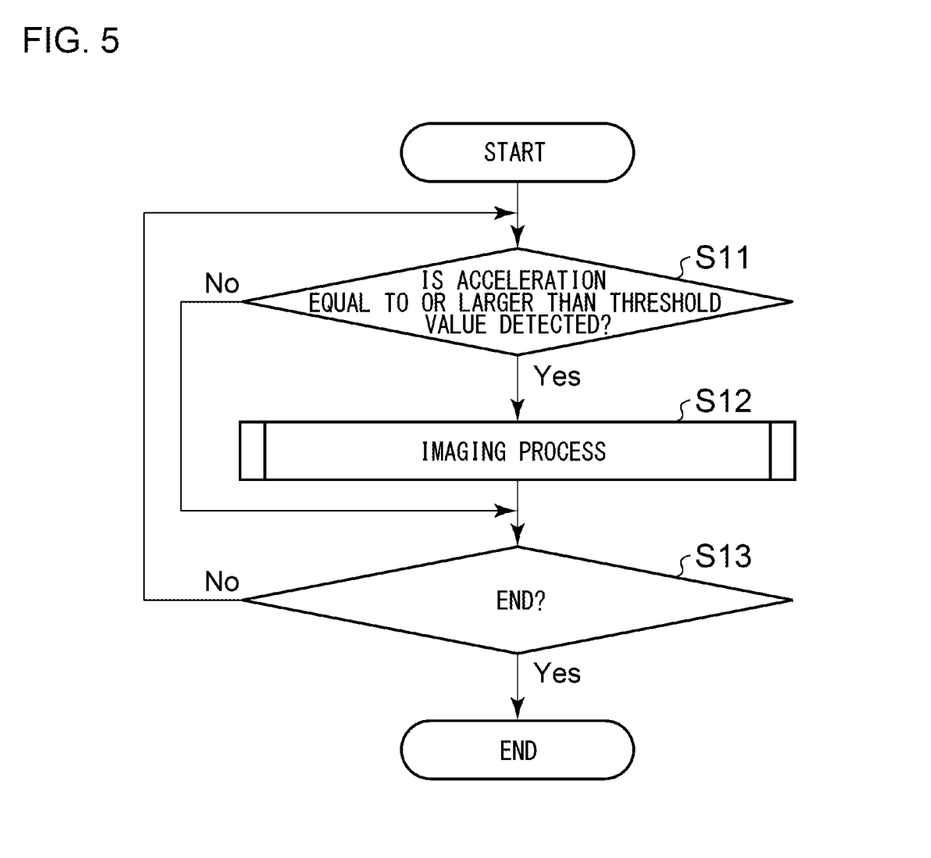
FIG. 5 is a flowchart showing a sequence of the operation performed by the unmanned air vehicle of FIG. 2.

A description will be given of the operation of the imaging system 1000 having the configuration described above. FIG. 5 is a flowchart showing a sequence of the operation performed by the unmanned air vehicle 100. When the acceleration detector 146 detects the acceleration equal to or larger than the threshold value (Yes in S11), the unmanned air vehicle 100 performs an imaging process (S12). When the acceleration detector 146 does not detect the acceleration equal to or larger than the threshold value (No in S11), step 12 is skipped. When the process should not be ended (No in S13), control is returned to step 11. When the process should be ended (Yes in S13), the process is ended.

Figure 6:
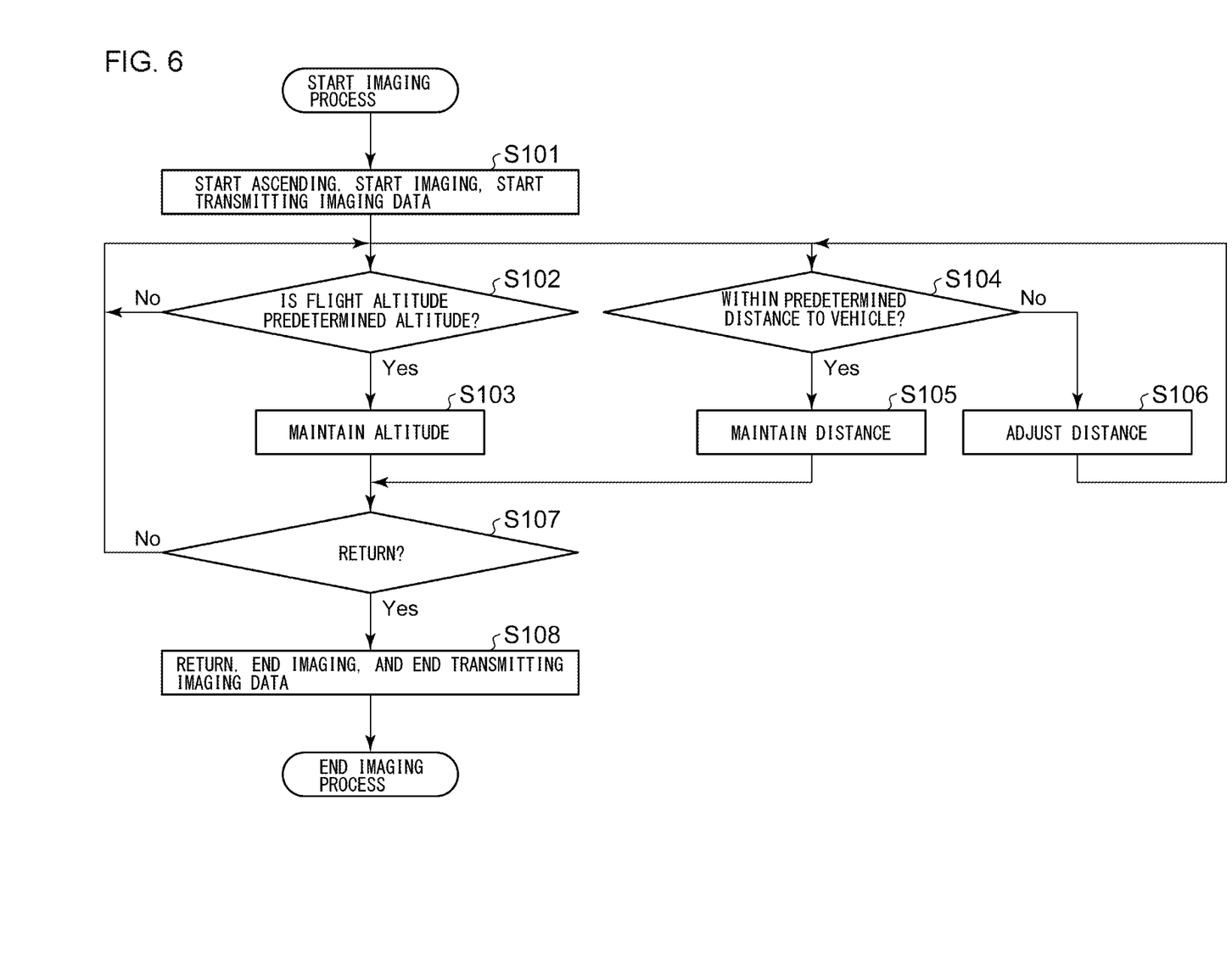
FIG. 6 is a flowchart showing a sequence of the imaging process performed by the unmanned air vehicle of FIG. 2.

FIG. 6 is a flowchart showing a sequence of the imaging process performed by the unmanned air vehicle 100, i.e., the imaging process in step 12 of FIG. 5. The flight controller 140 and the drive controller 142 cause the unmanned air vehicle 100 to start ascending, the imaging controller 144 causes the imaging unit 112 to start imaging, and the communication controller 148 causes the communication unit 122 to start transmitting the imaging data (S101). When the flight altitude is not a predetermined altitude (No in S102), the system stands by. When the flight altitude is the predetermined altitude (Yes in S102), the flight controller 140 and the drive controller 142 maintain the altitude of the unmanned air vehicle 100 (S103). When the distance to the vehicle 10 does not exceed a predetermined range (Yes in S104), the flight controller 140 and the drive controller 142 maintain the distance to the vehicle 10 (S105). When the distance to the vehicle 10 exceeds the predetermined distance (No in S104), the flight controller 140 and the drive controller 142 adjust the distance to the vehicle 10 (S106), and control is returned to step 104.

When it is not time to return (No in S107), control is returned to step 102 and step 104. When it is time to return (Yes in S107), the flight controller 140 and the drive controller 142 return the unmanned air vehicle 100, the imaging controller 144 causes the imaging unit 112 to stop imaging, and the communication controller 148 causes the communication unit 122 to stop transmitting the imaging data (S108).

According to the exemplary embodiment, the unmanned air vehicle is unlocked, when the acceleration equal to or larger than the predetermined value is exerted to the vehicle, in the direction opposite to the direction in which the acceleration is exerted. Therefore, the unmanned air vehicle can be moved to a proper flight position. Further, the unmanned air vehicle is moved to a proper flight position so that the situation of an accident or the like can be imaged from a proper flight position. Further, the unmanned air vehicle is unlocked, when the acceleration equal to or larger than the predetermined threshold value is exerted to the vehicle, in the direction opposite to the direction in which the acceleration is exerted. Therefore, the unmanned air vehicle can image the vehicle from above in the sky on the front side when the vehicle is suddenly braked or the vehicle collides with another vehicle in front. Further, the unmanned air vehicle is unlocked, when the acceleration equal to or larger than the predetermined threshold value is exerted to the vehicle, in the direction opposite to the direction in which the acceleration is exerted. Therefore, the unmanned air vehicle can image the vehicle from above in the sky on the rear side when another vehicle behind collides with the vehicle. Further, the unmanned air vehicle is unlocked, when the acceleration equal to or larger than the predetermined threshold value is exerted to the vehicle, in the direction opposite to the direction in which the acceleration is exerted. Therefore, takeoff and landing of the unmanned air vehicle capable of imaging the vehicle can be controlled.

Further, the flight is controlled so that the unmanned air vehicle ascends when the acceleration equal to or larger than the threshold value is detected. Therefore, takeoff and landing of the unmanned air vehicle can be controlled. Further, imaging is tarted when the unmanned air vehicle detects the acceleration equal to or larger than the threshold value so that the timing to start imaging can be properly controlled. Further, the unmanned air vehicle takeoff and landing dock unlocks, when the acceleration equal to or larger than the predetermined threshold value is exerted in the longitudinal direction of the vehicle, the unmanned air vehicle in the direction opposite to the direction in which the acceleration is exerted. Therefore, takeoff and landing of the unmanned air vehicle capable of imaging the vehicle can be controlled. Further, the acceleration equal to or larger than the threshold value exerted in the longitudinal direction of the vehicle is the acceleration corresponds to that of sudden braking or collision of the vehicle. Therefore, flight and imaging can be executed in response to sudden braking or collision of the vehicle as a trigger. Further the flight of the unmanned air vehicle is controlled to maintain a predetermined distance and a predetermined altitude from the vehicle after imaging is started. Therefore, the vehicle can be imaged from a proper flight position.

Exemplary Embodiment 2

A description will now be given of exemplary embodiment 2. Like exemplary embodiment 1, exemplary embodiment 2 relates to the imaging system 1000 that includes the unmanned air vehicle 100 unlocked from the unmanned air vehicle takeoff and landing dock 200 when the vehicle 10 receives the acceleration equal to or larger than the threshold value. In exemplary embodiment 1, the unmanned air vehicle 100 recognizes unlocking by detecting the acceleration equal to or larger than the threshold value. The unmanned air vehicle 100 in exemplary embodiment 2 detects unlocking directly. The imaging system 1000 according to exemplary embodiment 2 is of the same as that of FIGS. 1A-1B and FIGS. 3A-3B. The following description of the variation highlights the difference from exemplary embodiment 1.

Figure 7:
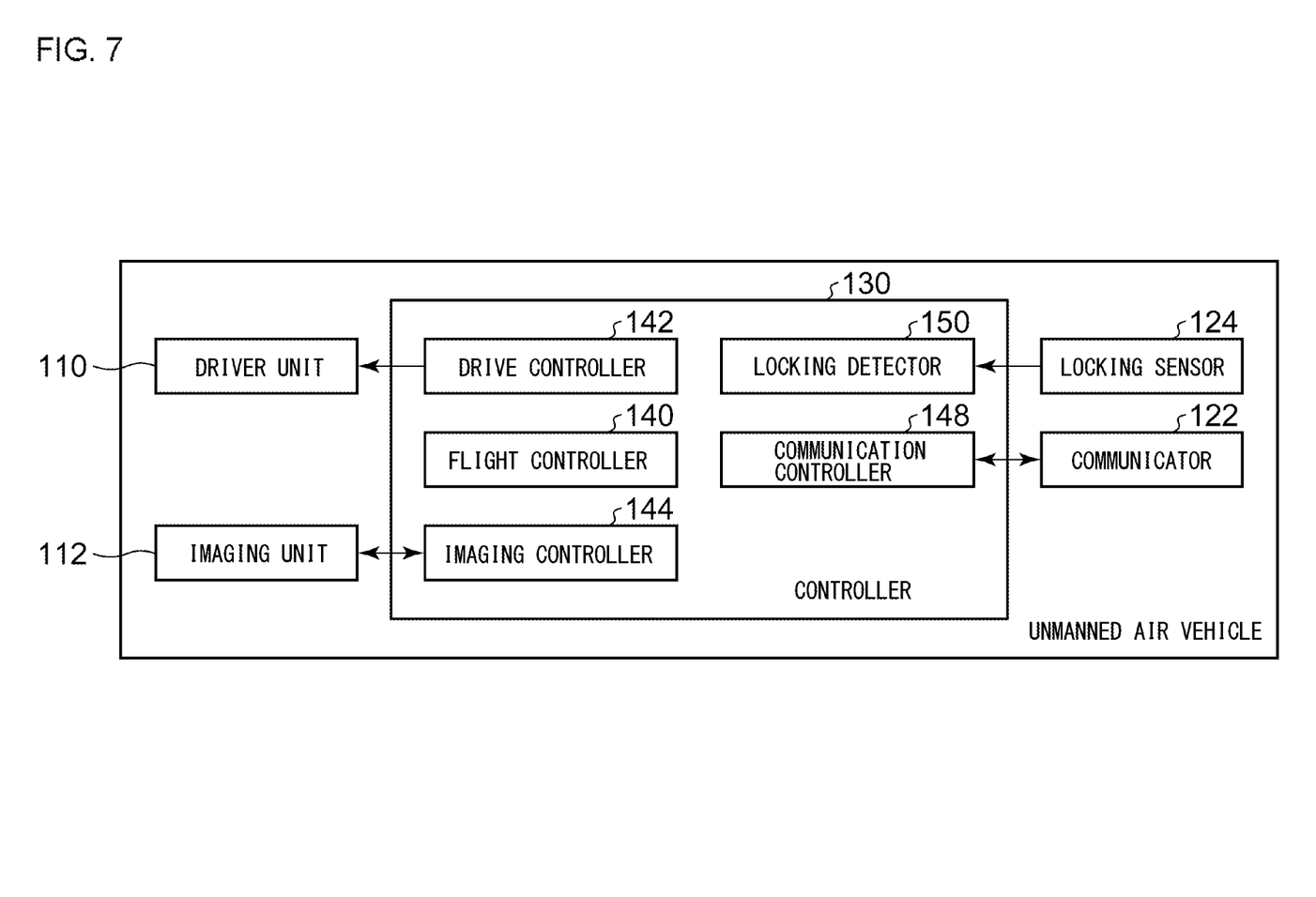
FIG. 7 shows configuration of the unmanned air vehicle according to exemplary embodiment 2.

FIG. 7 shows configuration of the unmanned air vehicle 100. The unmanned air vehicle 100 includes the drive unit 110, the imaging unit 112, the communication unit 122, a locking sensor 124, and the controller 130. The controller 130 includes the flight controller 140, the drive controller 142, the imaging controller 144, the communication controller 148, and a locking detector 150.

The locking sensor 124 detects whether the front leg part 114 is locked to the front locking part 214. The locking sensor 124 detects that the front leg part 114 is locked when electric conduction is established between the front leg part 114 and the front locking part 214 and detects that the front leg part 114 is not locked when electric conduction is not established between the front leg part 114 and the front locking part 214. Further, the locking sensor 124 detects whether the rear leg part 116 is locked to the rear locking part 216. The locking sensor 124 detects that the rear leg part 116 is locked when electric conduction is established between the rear leg part 116 and the rear locking part 216 and detects that the rear leg part 116 is not locked when electric conduction is not established between the rear leg part 116 and the rear locking part 216. The locking sensor 124 outputs the detection result for the front leg part 114 and the detection result for the rear leg part 116 to the locking detector 150.

The locking detector 150 receives the detection results from the locking sensor 124. When the detection results show that the front leg part 114 is locked to the front locking part 214 and the rear leg part 116 is locked to the rear locking part 216, the locking detector 150 detects locking by the unmanned air vehicle takeoff and landing dock 200. When the front leg part 114 or the rear leg part 116 is not locked, on the other hand, the locking detector 150 detects unlocking from the unmanned air vehicle takeoff and landing dock 200. When the locking detector 150 detects unlocking, the same process as performed when the acceleration detector 146 detects the acceleration equal to or larger than the threshold value in exemplary embodiment 1 is performed.

Figure 8:
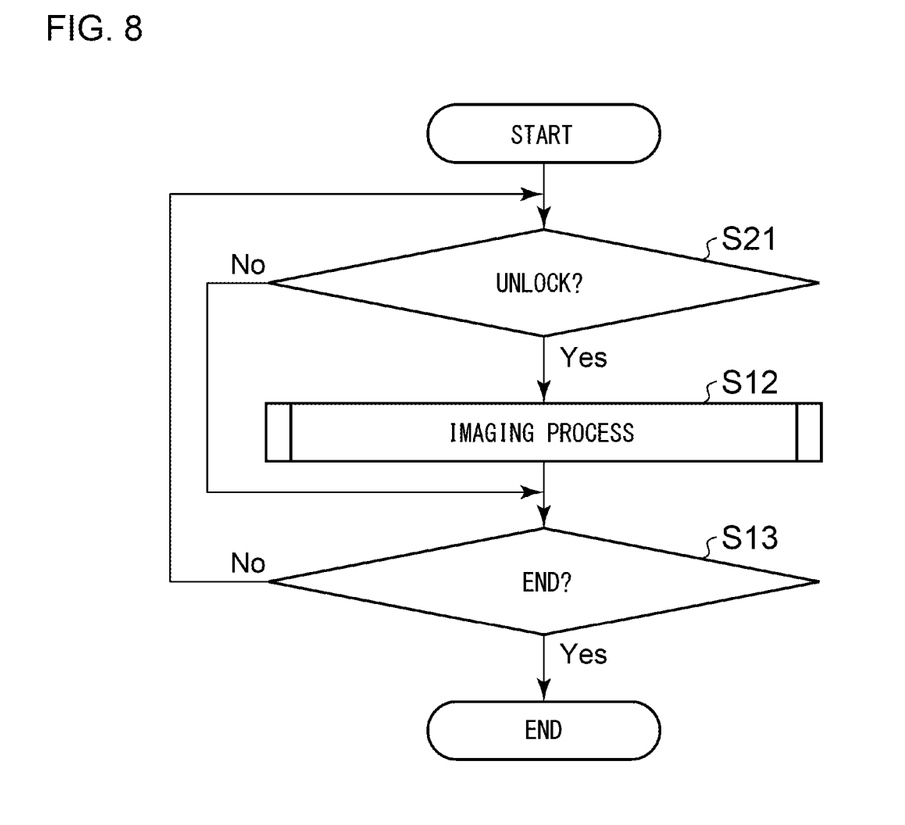
FIG. 8 is a flowchart showing a sequence of the operation performed by the unmanned air vehicle of FIG. 7.

A description will be given of the operation of the imaging system 1000 having the configuration described above. FIG. 8 is a flowchart showing a sequence of the operation performed by the unmanned air vehicle 100. When the acceleration detector 146 detects the acceleration equal to or larger than the threshold value (Yes in S21), the unmanned air vehicle 100 performs an imaging process (S12). When the acceleration detector 146 does not detect the acceleration equal to or larger than the threshold value (No in S21), step 12 is skipped. When the process should not be ended (No in S13), control is returned to step 11. When the process should be ended (Yes in S13), the process is ended.

According to the exemplary embodiment, the flight of the unmanned air vehicle is controlled to cause the unmanned air vehicle to ascend when unlocking from the unmanned air vehicle takeoff and landing dock is detected. Accordingly, takeoff and landing of the unmanned air vehicle capable of imaging the vehicle can be controlled.

The present invention has been described above based on exemplary embodiments. The exemplary embodiments are intended to be illustrative only and it will be understood by those skilled in the art that various modifications to combinations of constituting elements and processes are possible and that such modifications are also within the scope of the present invention.

What is claimed is:

1. An imaging system comprising an unmanned air vehicle capable of flying and an unmanned air vehicle takeoff and landing dock capable of locking the unmanned air vehicle in a movable object, wherein
when an acceleration equal to or larger than a threshold value is exerted to the movable object, the unmanned air vehicle takeoff and landing dock unlocks the unmanned air vehicle in a direction opposite to a direction in which the acceleration is exerted,
the unmanned air vehicle includes:
a flight controller that controls flight of the unmanned air vehicle;
an imaging unit that images a range including at least a vertical direction of the unmanned air vehicle;
an imaging controller that controls imaging by the imaging unit to acquire imaging data;
a communication controller that transmits the imaging data acquired by the imaging controller to another device; and
an acceleration detector that detects an acceleration exerted to the unmanned air vehicle, wherein
when the acceleration detector detects the acceleration equal to or larger than a threshold value,
the flight controller controls flight of the unmanned air vehicle to cause the unmanned air vehicle to ascend,
the imaging controller causes the imaging unit to start imaging, and
the communication controller starts transmitting the imaging data acquired by the imaging controller.

2. The imaging system according to claim 1, wherein
when the acceleration equal to or larger than the threshold value is exerted in a longitudinal direction of the movable object, the unmanned air vehicle takeoff and landing dock release the unmanned air vehicle in a direction opposite to a direction in which the acceleration is exerted.

3. The imaging system according to claim 2, wherein
the acceleration equal to or larger than the threshold value exerted in the longitudinal direction of the movable object is an acceleration corresponding to that of sudden braking or collision of the movable object.

4. The imaging system according to claim 1, wherein
when the imaging controller causes the imaging unit to start imaging, the flight controller controls flight of the unmanned air vehicle to maintain a predetermined distance and a predetermined altitude from the movable object.

5. An imaging system comprising an unmanned air vehicle capable of flying and an unmanned air vehicle takeoff and landing dock capable of locking the unmanned air vehicle in a movable object, wherein
when an acceleration equal to or larger than a threshold value is exerted to the movable object, the unmanned air vehicle takeoff and landing dock unlocks the unmanned air vehicle in a direction opposite to a direction in which the acceleration is exerted,
the unmanned air vehicle includes:
a flight controller that controls flight of the unmanned air vehicle;
an imaging unit that images a range including at least a vertical direction of the unmanned air vehicle;
an imaging controller that controls imaging by the imaging unit to acquire imaging data;
a communication controller that transmits the imaging data acquired by the imaging controller to another device; and
a locking detector that detects unlocking from the unmanned air vehicle takeoff and landing dock, wherein
when the locking detector detects unlocking,
the flight controller controls flight of the unmanned air vehicle to cause the unmanned air vehicle to ascend,
the imaging controller causes the imaging unit to start imaging, and
the communication controller starts transmitting the imaging data acquired by the imaging controller.

6. The imaging system according to claim 5, wherein
when the acceleration equal to or larger than the threshold value is exerted in a longitudinal direction of the movable object, the unmanned air vehicle takeoff and landing dock release the unmanned air vehicle in a direction opposite to a direction in which the acceleration is exerted.

7. The imaging system according to claim 6, wherein
the acceleration equal to or larger than the threshold value exerted in the longitudinal direction of the movable object is an acceleration corresponding to that of sudden braking or collision of the movable object.

8. The imaging system according to claim 5, wherein
when the imaging controller causes the imaging unit to start imaging, the flight controller controls flight of the unmanned air vehicle to maintain a predetermined distance and a predetermined altitude from the movable object.

* * * * *